(12) United States Patent
Kawasaki

(10) Patent No.: US 8,718,470 B2
(45) Date of Patent: May 6, 2014

(54) OPTICAL PACKET SWITCHING APPARATUS

(75) Inventor: Wataru Kawasaki, Kawasaki (JP)

(73) Assignee: Fujitsu Telecom Networks Limited, Kanagawa (JP)

( * ) Notice: Subject to any disclaimer, the term of this patent is extended or adjusted under 35 U.S.C. 154(b) by 125 days.

(21) Appl. No.: 13/528,691

(22) Filed: Jun. 20, 2012

(65) Prior Publication Data

US 2012/0328284 A1 Dec. 27, 2012

(30) Foreign Application Priority Data

Jun. 24, 2011 (JP) ................................. 2011-140981

(51) Int. Cl.
*H04J 14/00* (2006.01)
(52) U.S. Cl.
USPC .................................. 398/51; 398/54; 398/45
(58) Field of Classification Search
CPC .............. H04Q 11/00; H04Q 11/0001; H04Q 11/0003; H04Q 11/0005; H04Q 11/0062; H04Q 11/0066; H04Q 2011/0039; H04Q 2011/0041; H04Q 2011/0045
USPC .............................. 398/45–58, 25, 33, 19, 12
See application file for complete search history.

(56) References Cited

U.S. PATENT DOCUMENTS

| | | | | |
|---|---|---|---|---|
| 6,788,896 B1* | 9/2004 | Wang et al. | ...................... | 398/51 |
| 6,836,353 B1* | 12/2004 | Ramadas et al. | .............. | 359/298 |
| 8,542,996 B2* | 9/2013 | Kawasaki et al. | ................ | 398/54 |
| 2007/0223922 A1* | 9/2007 | Nakata | ............................. | 398/52 |
| 2012/0099859 A1* | 4/2012 | Watanabe | ........................ | 398/45 |

FOREIGN PATENT DOCUMENTS

JP 2008-235986 10/2008

* cited by examiner

*Primary Examiner* — M. R. Sedighian
(74) *Attorney, Agent, or Firm* — Christie, Parker & Hale, LLP

(57) ABSTRACT

An optical packet switching apparatus includes an optical coupler for branching off a received optical packet signal, an optical switch unit for switching the route of one of the branched-off optical packet signals so as to be outputted, and an optical switch control unit for controlling the optical switch unit. The optical switch control unit includes an optical-to-electrical conversion unit for converting the other of the branched-off optical packet signals into an electrical packet signal, a serial/parallel conversion unit capacitively coupled to the optical-to-electrical conversion unit, a packet density detector for detecting the packet density of the received packet signal, and a DC offset adjustment unit for adjusting the DC offset voltage of the packet signal, inputted to the serial/parallel conversion unit, according to the packet density information detected by the packet density detector.

12 Claims, 11 Drawing Sheets

OPTICAL PACKET SWITCHING APPARATUS

CROSS-REFERENCE TO RELATED APPLICATION

This application claims priority to and the benefit of Japanese Patent Application Number 2011-140981, filed on Jun. 24, 2011, the entire disclosure of which is incorporated herein by reference.

BACKGROUND OF THE INVENTION

1. Field of the Invention

The present invention relates to an optical packet switching system that enables packet switching for each optical packet by switching an optical switch according to routing information given to an optical packet signal.

2. Description of the Related Art

In optical transmission systems employing wavelength division multiplexing (WDM), a technique that performs the path switching per wavelength by the use of a wavelength selective switch (WSS) and the like is put to practical use. As a technology that may succeed this technique, an optical packet switching method is now being investigated. In this optical packet switching method, an IP packet (10 GEther (10 Gigabit Ethernet (registered trademark) signal and the like), for example, is used as a small unit with which the switching is performed, and each is converted into the form of an optical packet and then the route is switched by an ultrahigh-speed optical switch (see Reference (1) in the following Related Art List, for instance).

The IP packet does not transfer any significant information in the absence of data therein, so that the bandwidth corresponding thereto is wasted. However, if the optical packet switching system is realized, then the time slot of a packet where data is absent can be occupied by another packet. Therefore, the optical packet switching system is considered a promising technology of the future which is capable of markedly enhancing the bandwidth usage efficiency of the transmission path.

RELATED ART LIST (1) Japanese Unexamined Patent Application Publication No. 2008-235986.

FIG. 1 shows a construction of an optical packet signal. As shown in FIG. 1, the optical packet signal is comprised of a data area, which is a user area, a preamble, a synchronization pattern and routing information, which are all provided before the data area, and an error detecting FCS (frame check sequence). The preamble is used to stabilize an optical receiver that receives optical packet signals. The preamble and the frame synchronization pattern are fixed pattern. The synchronization patter is used to establish the frame synchronization. The routing information contains packet length information, destination information, and source (sender) information.

In the optical packet switching scheme, there exists a period of time (so-called "gap time" as shown in FIG. 1) during which the optical signal is absent between adjacent optical packets. Here, the ratio of the packet presence time over the total time duration of the packet presence time and the gap time (namely, the packet present time divided by the sum of the packet presence time and the gap time) is defined as "packet density". In the optical packet switching scheme, the data amount differs and the packet present time varies per packet, so that the packet density varies in real time.

In an optical packet switching apparatus, an optical packet signal received is bifurcated. Then one of the bifurcated optical packets is inputted to an optical switch unit, whereas the other thereof is inputted to an optical switch control unit for controlling the optical switch unit.

FIG. 2 shows an example of the optical switch control unit. As shown in FIG. 2, an optical switch control unit 100 includes an optical-to-electrical (O/E) conversion unit 101 and an electrical processing unit 102.

The optical-to-electrical conversion unit 101 includes a photodiode (PD) 103 for converting an inputted optical packet signal into an electrical packet signal DT, a clock extraction unit 104 for extracting a clock signal CLK from the packet signal DT, a differential output amplifier 105 for converting the packet signal DT into differential packet signals DT-P and DT-N and outputting them, and a differential output amplifier 106 for converting the clock signal CLK into differential clock signals CLK-P and CLK-N and outputting them.

The electrical processing unit 102 includes a differential input amplifier 109 for receiving the inputs of the differential packet signals DT-P and DT-N fed from the optical-to-electrical conversion unit 101, a differential input amplifier 110 for receiving the inputs of the differential clock signals CLK-P and CLK-N fed from the optical-to-electrical conversion unit 101, and a packet processing unit 111 for extracting the routing information from the packet signal DT and then generating an optical switch control signal according to the routing information. Signal lines that the differential packet signals DT-P and DT-N and the differential clock signals CLK-P and CLK-N inputted to the differential input amplifiers 109 and 110, respectively, pass through are terminated in 50 ohms by terminating resistors 107 and 108, respectively.

The differential output amplifier 105 of the optical-to-electrical conversion unit 101 and the differential input amplifiers 109 of the electrical processing unit 102 are capacitively coupled to each other via coupling capacitors 112. Similarly, the differential output amplifier 106 of the optical-to-electrical conversion unit 101 and the differential input amplifier 110 of the electrical processing unit 102 are capacitively coupled to each other via coupling capacitors 113. This is because the differential output amplifiers 105 and 106 of the optical-to-electrical conversion unit 101 have potential interfaces different from those for the differential input amplifiers 109 and 110 of the electrical processing unit 102 and therefore the potential interfaces of different types cannot be directly connected to each other. The DC (direct current) components of the differential packet signals DT-P and DT-N and the differential clock signals CLK-P and CLK-N outputted form the optical-to-electrical conversion unit 101 are removed by the coupling capacitors 112 and 113.

FIG. 3 shows an example of differential packet signals inputted to the electrical processing unit when the packet density is high. In this example, both the DC level of a positive signal DT-P (solid line in FIG. 3) of a differential packet signal and the DC level of a negative signal DT-N (dashed line in FIG. 3) thereof are such that their amplitudes each has a positive and a negative part around 0 V (GND). Thus, the positive signal DT-P and the negative signal DT-N present ideal differential states. In other words, the high (H) potentials of DT-P and DT-N are identical to each other, and the low (L) potentials thereof are also identical thereto, thereby making it possible to achieve a high-quality signal transmission FIG. 4 shows an example of a differential packet signal inputted to the electrical processing unit when the packet density is low. In this example, the low (L) potential of a positive signal DT-P (solid line in FIG. 4) approaches 0 V, and the high (H) potential of a negative signal DT-N (dashed line in FIG. 4) approaches 0 V. Thus, the potential where the positive signal DT-P and the negative signal DT-N overlap with each other becomes small as illustrated in FIG. 4. As a result, when a differential packet signal is regenerated by the packet processing unit 111, the duty ratio is deviated from the ideal 1/2 and therefore the signal degrades. As the packet signal degrades, the routing information cannot be extracted from the packet signal and thus the optical packet signal may not be properly switched.

SUMMARY OF THE INVENTION

The present invention has been made in view of the foregoing circumstances, and a purpose thereof is to provide a technology for suitably switching an optical packet signal in an optical packet switching method where the packet density varies.

In order to resolve the above-described problems, an optical packet switching apparatus according to one embodiment of the present invention includes: a branching unit configured to branch off a received optical packet signal; an optical switch unit configured to switch a route of one of the branched-off optical packet signals so as to be outputted; an optical switch control unit configured to convert the other of the branched-off optical packet signals into an electrical packet signal, configured to then extract routing information from the packet signal, and configured to control the optical switch unit according to the routing information extracted, wherein the optical switch control unit includes a first electrical circuit configured to perform a predetermined processing on the packet signal and a second electrical circuit, provided at a stage subsequent to the first electrical circuit, configured to perform a predetermined processing on the packet signal, the second electrical circuit being capacitively coupled to the first electrical circuit; a packet density detector configured to detect a packet density of the received optical packet signal; and a DC offset adjustment unit configured to adjust a DC offset voltage of the packet signal, inputted to the second electrical circuit, according to information on the packet density detected by the packet density detector.

The packet signal may be a differential signal in between the first electrical circuit and the second electrical circuit, and the DC offset adjustment unit may adjust the DC offset voltage of at least one of a positive signal and a negative signal of the differential signal.

The DC offset adjustment unit may adjust the DC offset voltage by referencing a table that describes a relation between the packet density and the DC offset voltage.

The packet density detector may include: a counter configured to count the number of packets received in a preset time duration; a packet length detector configured to detect the packet length of each packet signal; and a calculating unit configured to calculate the packet density based on information on the number of received packets counted by the counter and information on the packet length detected by the packet length detector.

The branching unit may receive an optical packet signal in which the information on the packet density is stored, and the packet density detector may extract the information on the packet density stored in the optical packet signal.

Another embodiment of the present invention relates also to an optical packet switching apparatus. The apparatus includes: a branching unit configured to branch off a received optical packet signal; an optical switch unit configured to switch a route of one of the branched-off optical packet signals so as to be outputted; an optical switch control unit configured to convert the other of the branched-off optical packet signals into an electrical packet signal, configured to then extract routing information from the packet signal, and configured to control the optical switch unit according to the routing information extracted, wherein the optical switch control unit includes a first electrical circuit configured to perform a predetermined processing on the packet signal and a second electrical circuit, provided at a stage subsequent to the first electrical circuit, configured to perform a predetermined processing on the packet signal, the second electrical circuit being capacitively coupled to the first electrical circuit; an error detector configured to detect error in the received optical packet signal; and a DC offset adjustment unit configured to adjust a DC offset voltage of the packet signal, inputted to the second electrical circuit, according to information on the error detected by the error detector.

The packet signal may be a differential signal in between the first electrical circuit and the second electrical circuit, and the DC offset adjustment unit may adjust the DC offset voltage of at least one of a positive signal and a negative signal of the differential signal.

The DC offset adjustment unit may adjust the DC offset voltage in a manner such that the error detected by the error detector is minimum.

The error detector may be configured in such a manner as to detect the error using a frame check sequence (FCS).

The optical packet switching apparatus may further include a memory configured to store the DC offset voltage adjusted by the DC offset adjustment unit, wherein, when the optical packet switching apparatus is restarted, the DC offset adjustment unit may adjust the DC offset voltage, based on voltage values stored in the memory.

The DC offset adjustment unit may be configured such that the DC offset voltage is adjusted by varying a resistance value of a variable resistor.

The DC offset adjustment unit may be configured such that the DC offset voltage is adjusted by varying a bias voltage.

Optional combinations of the aforementioned constituting elements, and implementations of the invention in the form of methods, apparatuses, systems, programs, recording media storing the programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Hereinbelow, optical packet switching apparatuses according to preferred embodiments of the present invention are explained referring to drawings.

First Embodiment

Figure 5:
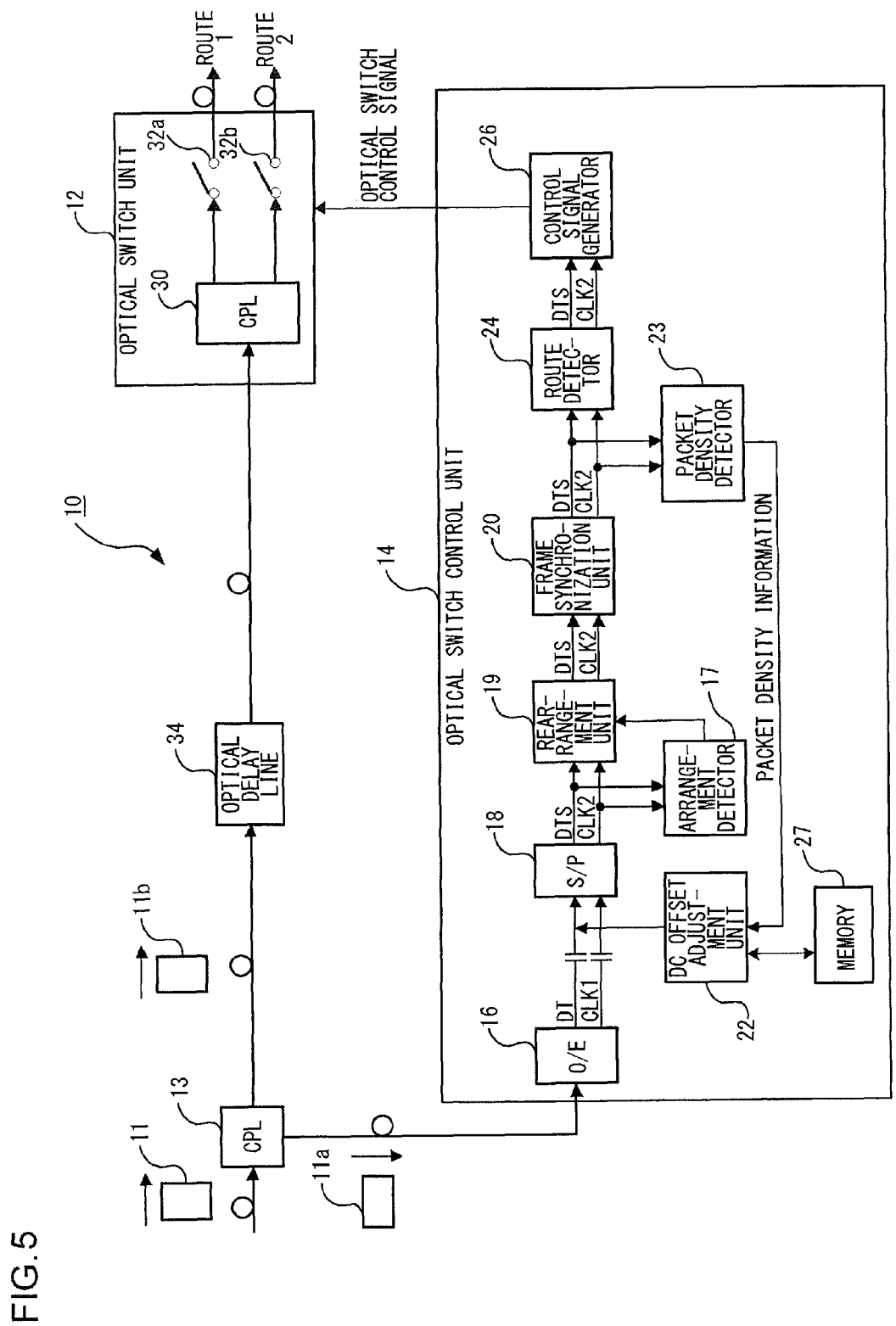
FIG. 5 is a diagram for explaining a structure of an optical packet switching apparatus according to a first embodiment of the present invention.

FIG. 5 is a diagram for explaining a structure of an optical packet switching apparatus according to a first embodiment of the present invention. As shown in FIG. 5, an optical packet switching apparatus 10 includes an optical coupler 13, an optical switch unit 12, and optical switch control unit 14. An optical packet signal inputted to the optical packet switching apparatus 10 via a transmission path is branched off into two. The optical packet signal may be an optical packet signal of 10 GEther, for instance.

One optical packet signal 11a of the optical packet signals branched-off by the optical coupler 13 is inputted to the optical switch control unit 14, whereas the other optical packet signal 11b thereof is inputted to the optical switch unit 12 via an optical delay line 34. The optical switch control unit 14 extracts the routing information from the optical packet signal 11a and controls the optical switch unit 12 according to the extracted routing information. The optical switch unit 12 switches the route of the optical packet signal 11b according to an optical switch control signal fed from the optical switch control unit 14 and then outputs it.

The optical switch control unit 14 includes an optical-to-electrical (O/E) conversion unit 16, a serial/parallel (S/P) conversion unit 18, an arrangement detector 17, a rearrangement unit 19, a frame synchronization unit 20, a packet density detector 23, a route detector 24, a control signal generator 26, a DC offset adjustment unit 22, and a memory 27.

The optical-to-electrical conversion unit 16 O/E-converts the received optical packet signal 11a, then performs predetermined processings, such as amplification, clock extraction, identification and reproduction, on the O/E-converted optical packet signal 11a, and outputs an electrical packet signal DT and a clock signal CLK1 to the serial/parallel conversion unit 18.

The optical-to-electrical conversion unit 16 and the serial/parallel conversion unit 18 are capacitively coupled to each other by coupling capacitors. The DC components of the packet signal DT and the clock signal CLK are removed by the coupling capacitors, and the packet signal DT and the clock signal CLK whose DC components have been removed thereby are inputted to the serial/parallel conversion unit 18.

The serial/parallel conversion unit 18 performs serial/parallel conversion on the data signal DT so as to output a parallel data signal DTS and, at the same time, divides the frequency of the clock signal CLK1 so as to output a frequency-divided clock signal CLK2. For example, the serial/parallel conversion unit 18 performs a serial/parallel conversion of 1:8. If, for example, the packet signal DT of 10 Gbps and the clock signal CLK1 of 10 GHz are inputted to the serial/parallel conversion unit 18, the parallel packet signals DTS of 1.25 Gps×8 and the frequency-divided clock signal CLK2 of 1.25 GHz will be outputted from the serial/parallel conversion unit 18.

The parallel packet signals DTS and the frequency-divided clock signal CLK2 outputted from the serial/parallel conversion unit 18 are inputted to the rearrangement unit 19. The parallel packet signals DTS and the frequency-divided clock signal CLK2 are also inputted to the arrangement detector 17. The arrangement detector 17 detects how the frame synchronization patterns contained in the parallel packet signals are arranged. The arrangement detector 17 outputs the detected information on the arrangement of the frame synchronization patterns, to the rearrangement unit 19. Based on the information on the arrangement, the rearrangement unit 19 rearranges the frame synchronization patterns such that the frame synchronization patterns are arranged in phase.

The parallel packet signals DTS, which have been rearranged by the rearrangement unit 19, and the frequency-divided clock signal CLK2 are inputted to the frame synchronization unit 20. The frame synchronization unit 20 accomplishes frame synchronization of the optical packet signals by detecting a predetermined frame synchronization pattern.

The parallel packet signals DTS and the frequency-divided clock signal CLK2 whose frame synchronization has been established at the frame synchronization unit 20 are inputted to the route detector 24. The route detector 24 detects the routing information from the received parallel packet signals DTS.

The control signal generator 26 generates an optical switch control signal used to control the turning on and off of an optical switch in the optical switch unit 12 according to the routing information detected by the route detector 24. The thus generated optical switch control signal is outputted to the optical switch unit 12.

The parallel packet signals DTS and the frequency-divided clock signal CLK2 whose frame synchronization has been established at the frame synchronization unit 20 are also inputted to the packet density detector 23. The packet density detector 23 detects the packet density based on the inputted parallel packet signals DTS, and outputs the information on the detected packet density to the DC offset adjustment unit 22.

The DC offset adjustment unit 22 adjusts the DC offset voltage of the packet signal DT inputted to the serial/parallel conversion unit 18, according to the packet density information fed back from the packet density detector 23.

The memory 27 stores the DC offset voltage which has been adjusted by the DC offset adjustment unit 22. When the optical packet switching apparatus 10 is restarted, the DC offset adjustment unit 22 adjusts the DC offset voltage of the packet signal DT, based on the voltage values stored in the memory 27. Thereby, the packet signal can be received with a DC offset voltage set before the restart.

On the other hand, the optical packet signal 11b, which is the other of the optical signals bifurcated at the optical coupler 13, is inputted to the optical switch unit 12 after passing through the optical delay line 34. If the optical packet signal 11b, which is branched off by the optical coupler 13, is inputted directly to the optical switch unit 12, the optical switch control signal outputted from the optical switch control unit 14 will not be in time for the timing at which the optical packet signal 11b arrives at the optical switch unit 12. Thus, the optical delay line 34 is provided between the optical coupler 13 and the optical switch unit 12 to eliminate the delay of the optical switch control signal in relation to the optical packet signal 11b. The optical delay line 34 can adjust the delay time by adjusting the optical fiber length.

The optical switch unit 12 is a 1×2 optical switch that has an optical coupler 30 for branching the inputted optical packet signal 11b off into two optical packet signals and a first optical switch 32a and a second optical switch 32b for receiving the branched-off optical packet signals. The first optical switch 32a and the second optical switch 32b may be implemented as ones employing a semiconductor optical amplifier (SOA) or an LN (lithium niobate) intensity modulator. The on/off of the first optical switch 32a and the second optical switch 32b is controlled by the optical switch control signal supplied from the control signal generator 26. For example, when the optical packet signal 11b is to be outputted to route 1, the first optical switch 32a is turned on (closed), and the second optical switch 122b turned off (opened). As a result, the optical packet signal 11b is outputted to route 1, passing through the optical switch 122a only.

Figure 6:
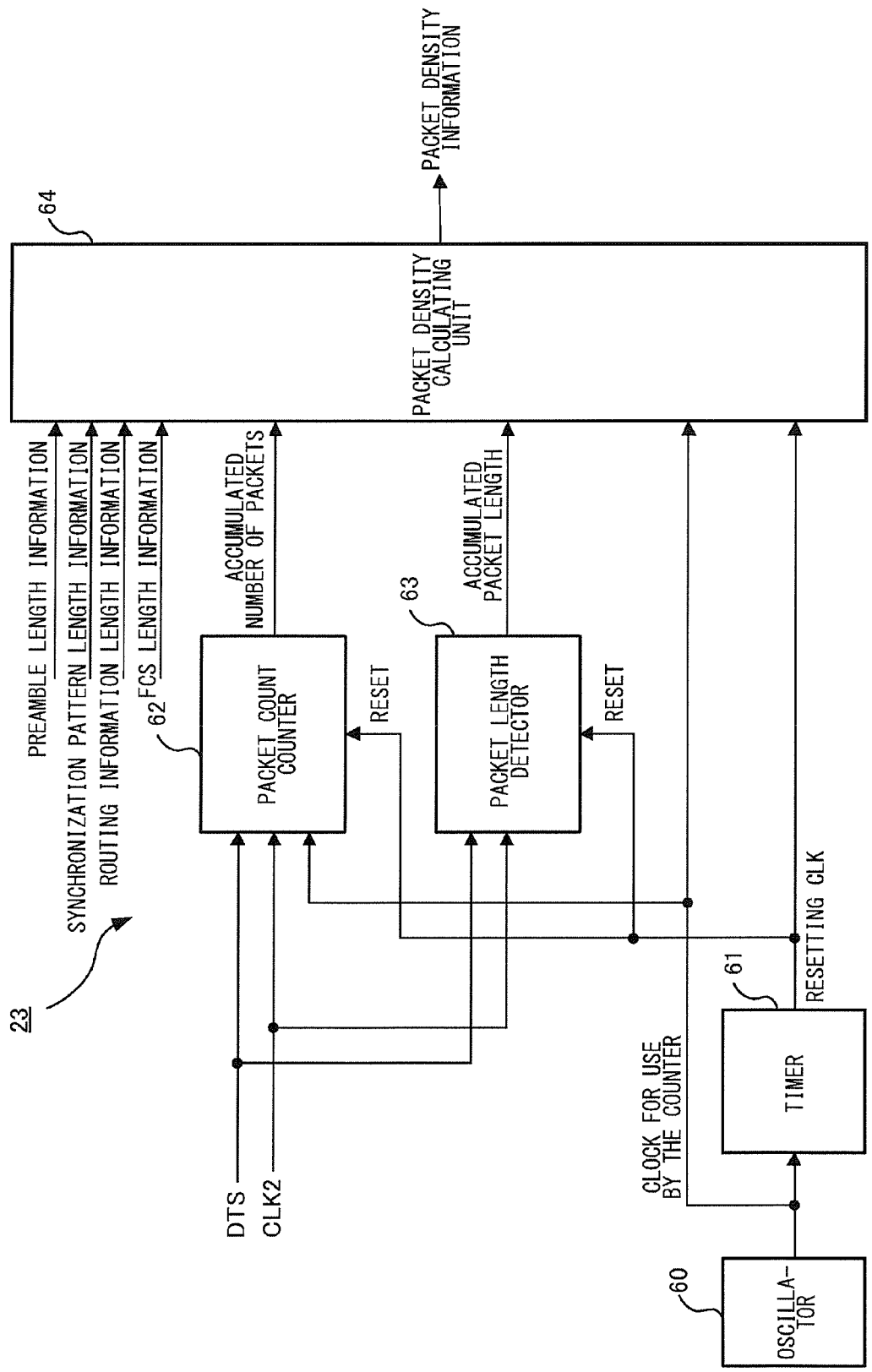
FIG. 6 is a diagram for explaining a structure of a packet density detector.

FIG. 6 is a diagram for explaining a structure of the packet density detector 23. As shown in FIG. 6, the packet density detector 23 includes an oscillator 60, a timer 61, a packet count counter 62, a packet length detector 63, and a packet density calculating unit 64.

The parallel packet signals DTS and the frequency-divided clock signal CLK2 are inputted to the packet count counter 62 from the frame synchronization unit 20. The packet count counter 62 counts the number of parallel packet signals DTS inputted in a given time duration by the use of a counting clock supplied from the oscillator 60. Here, a plurality of parallel packet signals DTS divided from each packet signal DTS are counted as a single packet signal. The accumulated number of packets is sent to the packet density calculating unit 64.

The parallel packet signals DTS and the frequency-divided clock signal CLK2 are also inputted to the packet length detector 63 from the frame synchronization unit 20. The packet length detector 63 extracts the packet length information from the parallel packet signals DTS and accumulates the length of packet signals inputted in a given time duration. The packet length is the data length of each packet signal. The accumulated packet length is sent to the packet density calculating unit 64.

The packet count information is inputted to the packet density calculating unit 64 from the packet count counter 62, whereas the accumulated packet length information is inputted thereto from the packet length detector 63. The preamble length information, the synchronization pattern length information, the routing information length information, and the FCS length information are also inputted to the packet density calculating unit 64. The preamble length, the synchronization pattern length, the routing information length, and the FCS length are each a fixed value. The packet density calculating unit 64 calculates the packet density based on the these pieces of information inputted. The packet density may be calculated using the following Equation (1).

(Packet density)=(The accumulated number of packets)×[(Preamble length)+(Synchronization pattern length)+(Packet length)+(Routing information length)+(FCS length)]/(A given length of time)   (Equation 1)

The timer 61 divides the frequency of the clock, for use by the counter, outputted from the oscillator 60 and generates a resetting clock. This resetting clock is sent to the packet count counter 62, the packet length detector 63, and the packet density calculating unit 64. The accumulated value and the like are reset by the resetting clock for every predetermined monitoring cycle, thereby calculating again the packet density.

Figure 7:
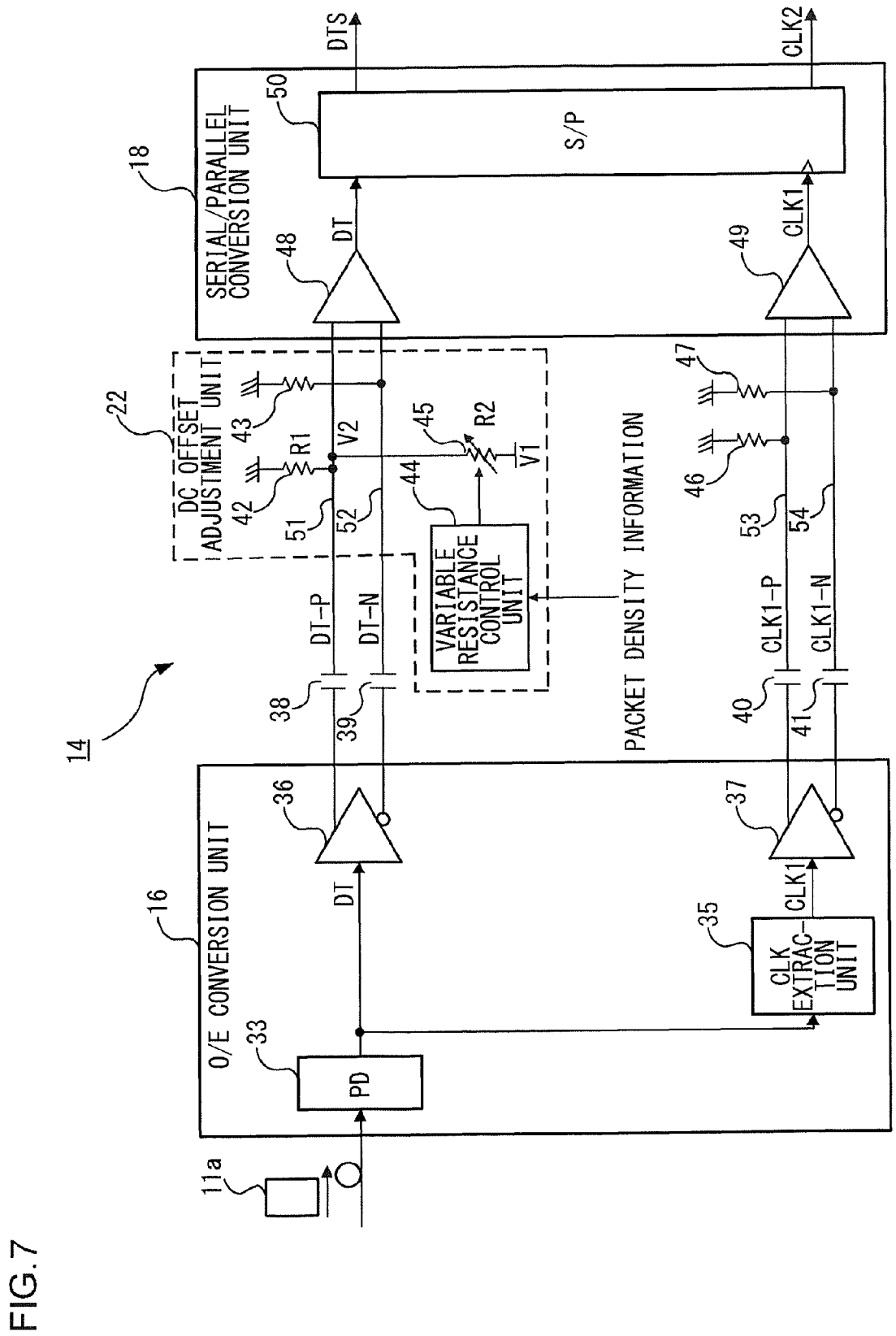
FIG. 7 is a diagram for explaining an embodiment of a DC offset adjustment unit.

FIG. 7 is a diagram for explaining an embodiment of a DC offset adjustment unit. FIG. 7 shows partial components of the optical switch control unit 14 corresponding to the optical-to-electrical (O/E) conversion unit 16, the DC offset adjustment unit 22 and the serial/parallel (S/P) conversion unit 18.

The optical-to-electrical conversion unit 16 includes a photodiode (PD) 33 for converting an inputted optical packet signal 11a into an electrical packet signal DT, a clock extraction unit 35 for extracting a clock signal CLK1 from the packet signal DT, a differential output amplifier 36 for converting the packet signal DT into differential packet signals DT-P and DT-N and outputting them, and a differential output amplifier 37 for converting the clock signal CLK1 into differential clock signals CLK1-P and CLK1-N and outputting them.

The serial/parallel conversion unit 18 includes a differential input amplifier 48 for receiving the input of the differential packet signals DT-P and DT-N from the optical-to-electrical conversion unit 16, a differential input amplifier 49 for receiving the input of the differential clock signals CLK1-P and CLK1-N from the optical-to-electrical conversion unit 16, and a serial/parallel (S/P) converter 50 performs a serial/parallel conversion of the packet signal DT and the clock signal CLK1.

In the first embodiment, the differential output amplifiers 36 and 37 of the optical-to-electrical conversion unit 16 have potential interfaces different from those for the differential input amplifiers 48 and 49 of the serial/parallel conversion unit 18. Thus the optical-to-electrical conversion unit 16 and the serial/parallel conversion unit 18 are capacitively coupled to each other by coupling capacitors 38, 39, 40 and 41.

The DC component of the positive signal DT-P of the differential packet signal outputted from the differential output amplifier 36 is cut off by the coupling capacitor 38. Also, the DC component of the negative signal DT-N of the differential packet signal outputted from the differential output amplifier 36 is cut off by the coupling capacitor 39. Also, the DC component of the positive signal CLK1-P of the differential clock signal outputted from the differential output amplifier 37 is cut off by the coupling capacitor 40. Also, the DC component of the negative signal CLK1-N of the differential clock signal outputted from the differential output amplifier 37 is cut off by the coupling capacitor 41. The signal lines 51, 52, 53 and 54 that the differential packet signals DT-P and DT-N and the differential clock signals CLK1-P and CLK1-N pass through are terminated in 50 ohms by terminating resistors 42, 43, 46 and 47, respectively.

The DC offset adjustment unit 22 includes terminal resistors 42 and 43, an electronically controllable variable resistor 45, and a variable resistance control unit 44 which controls the variable resistor 45. In the first embodiment, the DC offset adjustment unit 22 adjusts the DC offset voltage of the positive signal DT-P of the differential packet signal. The "DC offset voltage" is a shift amount from 0 V (GND) in the DC level of a signal in question.

As shown in FIG. 7, one terminal of the variable resistor 45 is connected to a predetermined bias voltage V1. The other terminal of the variable resistor 45 is connected to the signal line 51 that the positive signal DT-P, whose DC component has been cut off, passes through. As described above, this signal line 51 is grounded via the terminating resistor 42 of 50 ohms. Thus, the value of an DC offset voltage V2 of the positive signal DT-P is equal to the value where the bias voltage V1 is divided by the variable resistor 45 and the terminating resistor 42. The following Equation (2) indicates a method for calculating the DC offset voltage V2 of the positive signal DT-P.

$$V2 = (V1/(R2+R1)) \times R1 \quad \text{(Equation 2)}$$

Here, R1 is the resistance value of the terminating resistor 42 (i.e., 50 ohms) and R2 is the resistance value of the variable resistor 45.

As evident from Equation (2), changing the resistance value R2 of the variable resistor 45 by the variable resistance control unit 44 enables the adjustment of the DC offset voltage V2. In the first embodiment, the variable resistance control unit 44 adjusts the DC offset voltage V2 by varying the resistance value of the variable resistor 45 according to the packet density information supplied from the packet density detector 23.

Figure 1:
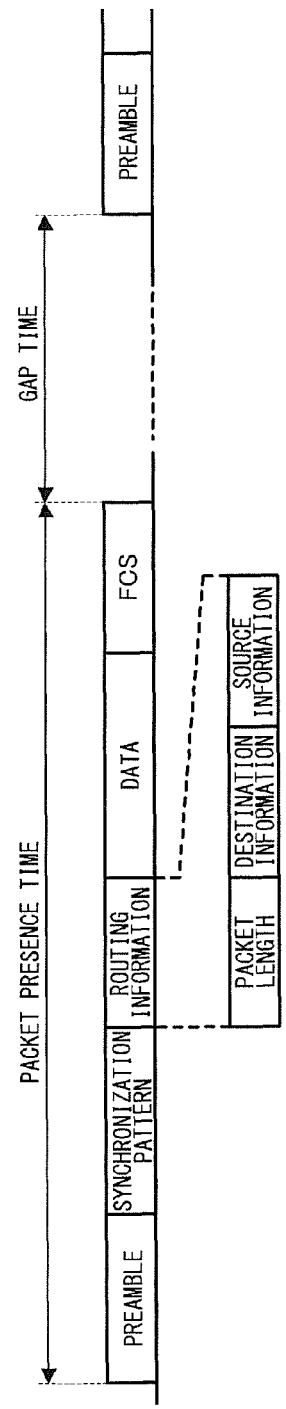
FIG. 1 shows a construction of an optical packet signal.
Figure 2:
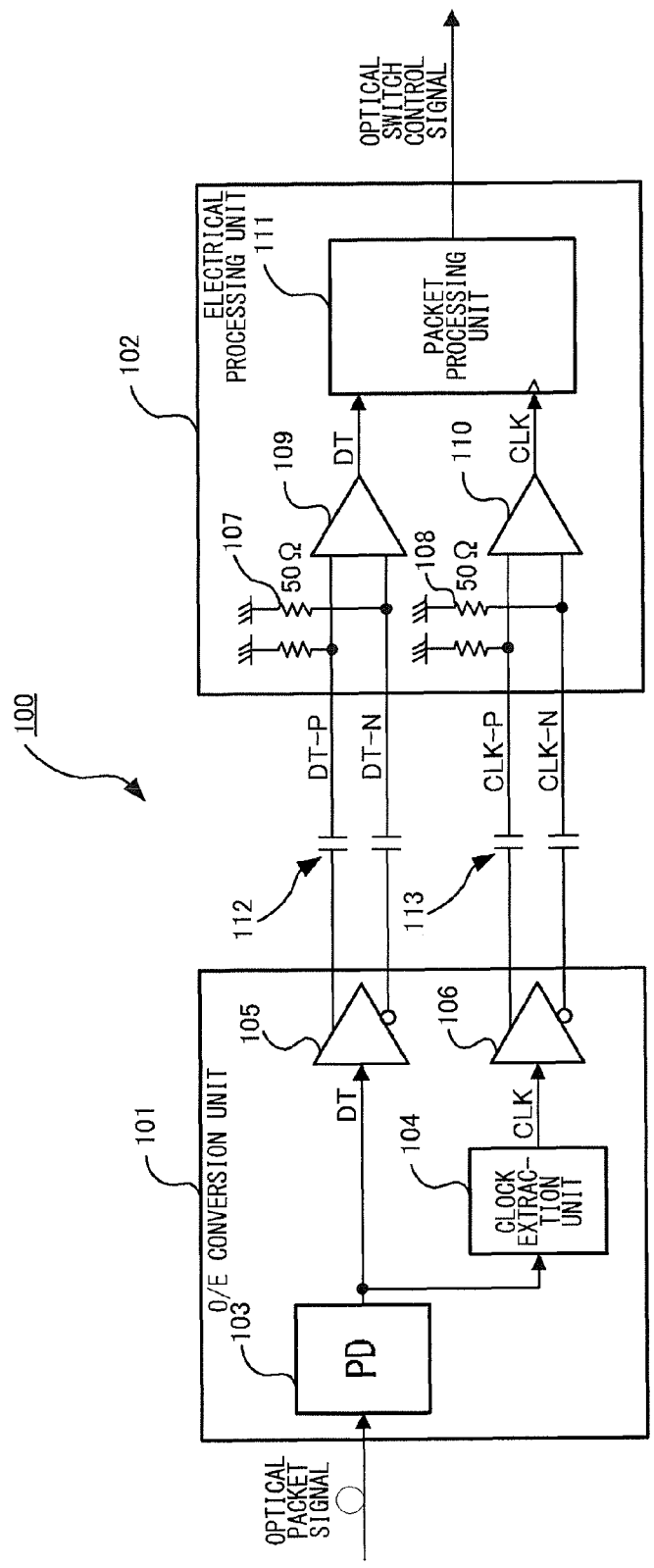
FIG. 2 shows an example of the optical switch control unit.
Figure 3:
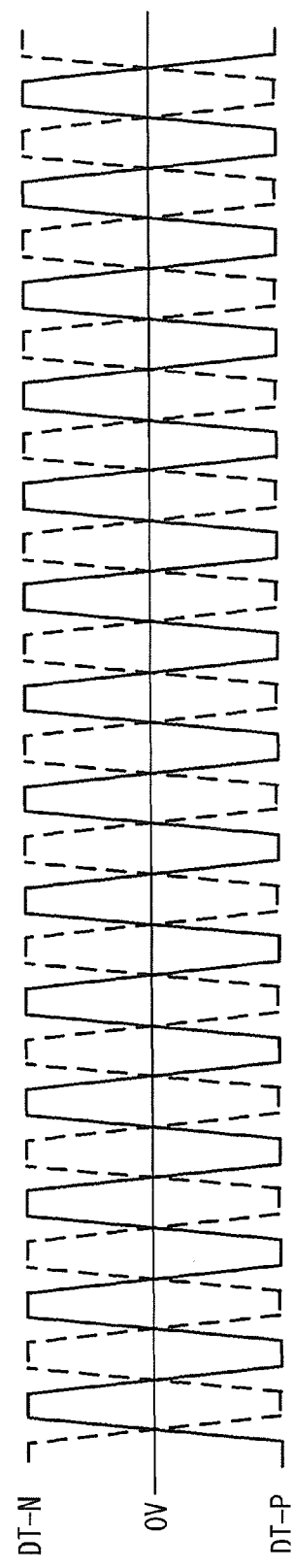
FIG. 3 shows an example of differential packet signals inputted to an electrical processing unit when the packet density is high.
Figure 4:
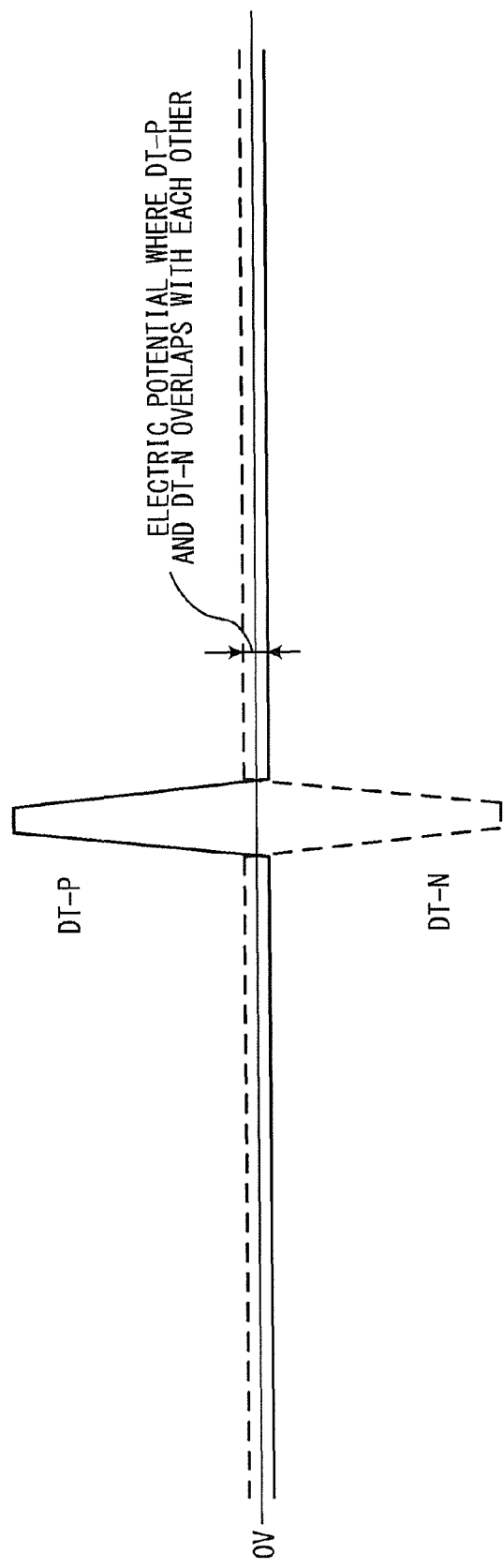
FIG. 4 shows an example of a differential packet signal inputted to an electrical processing unit when the packet density is low.
Figure 8:
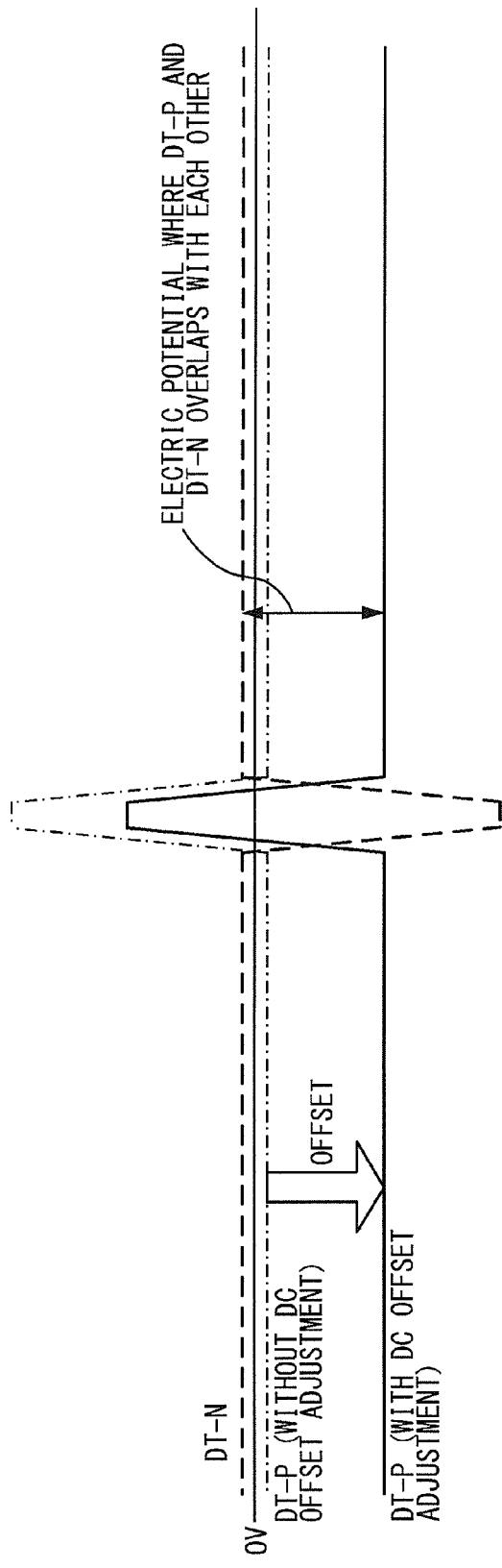
FIG. 8 is a diagram for explaining an operation of an optical packet switching apparatus according to a first embodiment of the present invention.

FIG. 8 is a diagram for explaining an operation of the optical packet switching apparatus according to the first embodiment of the present invention. FIG. 8 shows a differential packet signal inputted to the serial/parallel conversion unit 18 when the packet density is low. In FIG. 8, the dashed line indicates a negative signal DT-N and the dashed-dotted line indicates a positive signal DT-P when the adjustment of the DC offset voltage is not performed. Where no adjustment of the DC offset voltage of the positive signal DT-P is made, the low (L) potential of the positive signal DT-P approaches 0 V and the high (H) potential of the negative signal DT-N approaches 0 V as explained in FIG. 4. Thus, the potential where the positive signal DT-P and the negative signal DT-N overlap with each other becomes small.

In FIG. 8, the solid line indicates a positive signal DT-P when the adjustment of the DC offset voltage has been performed. The variable resistance control unit 44 adjusts the DC offset voltage of the positive signal DT-P according to the packet density. In the example shown in FIG. 8, the packet density is low and therefore the variable resistance control unit 44 controls the resistance value of the variable resistor 45 so that the DC offset voltage can be large. This allows the potential where the positive signal DT-P and the negative signal DT-N overlap with each other to be larger. As a result, the quality of the differential packet signal inputted to the serial/parallel conversion unit 18 can be enhanced. As described earlier, in the optical packet switching scheme, the packet density varies with time. For example, as the packet density increases thereafter, the variable resistance control unit 44 adjusts the resistance value of the variable resistor 45 so that the DC offset voltage can be small.

In this manner, even if the packet density varies, the optical packet switching apparatus 10 according to the first embodiment can maintain the quality of the differential packet signal inputted to the serial/parallel conversion unit 18. As a result, the routing information can be reliably extracted from the packet signals and therefore the optical packet signal can be suitably switched.

The relation between the packet density and the DC level of the positive signal DT-P may be obtained in advance through experiments or simulation runs. Thus, the relation between the packet density and the required DC offset voltage can also be obtained in advance. Here, the required DC offset voltage means the DC offset voltage which is so required that the potential where the positive signal DT-P and the negative signal DT-N overlap with each other can be of a predetermined reference value or above. The variable resistance control unit 44 may adjust the DC offset voltage by referencing a table that describes such a relation between the packet density and the DC offset voltage.

In the embodiment described as above, the structure is such that the DC offset voltage of the positive signal DT-P is adjusted. Instead, the structure may be such that the DC offset voltage of the negative signal DT-N is adjusted. Also, the structure may be such that both the positive signal DT-P and the negative signal DT-N are adjusted.

Figure 9:
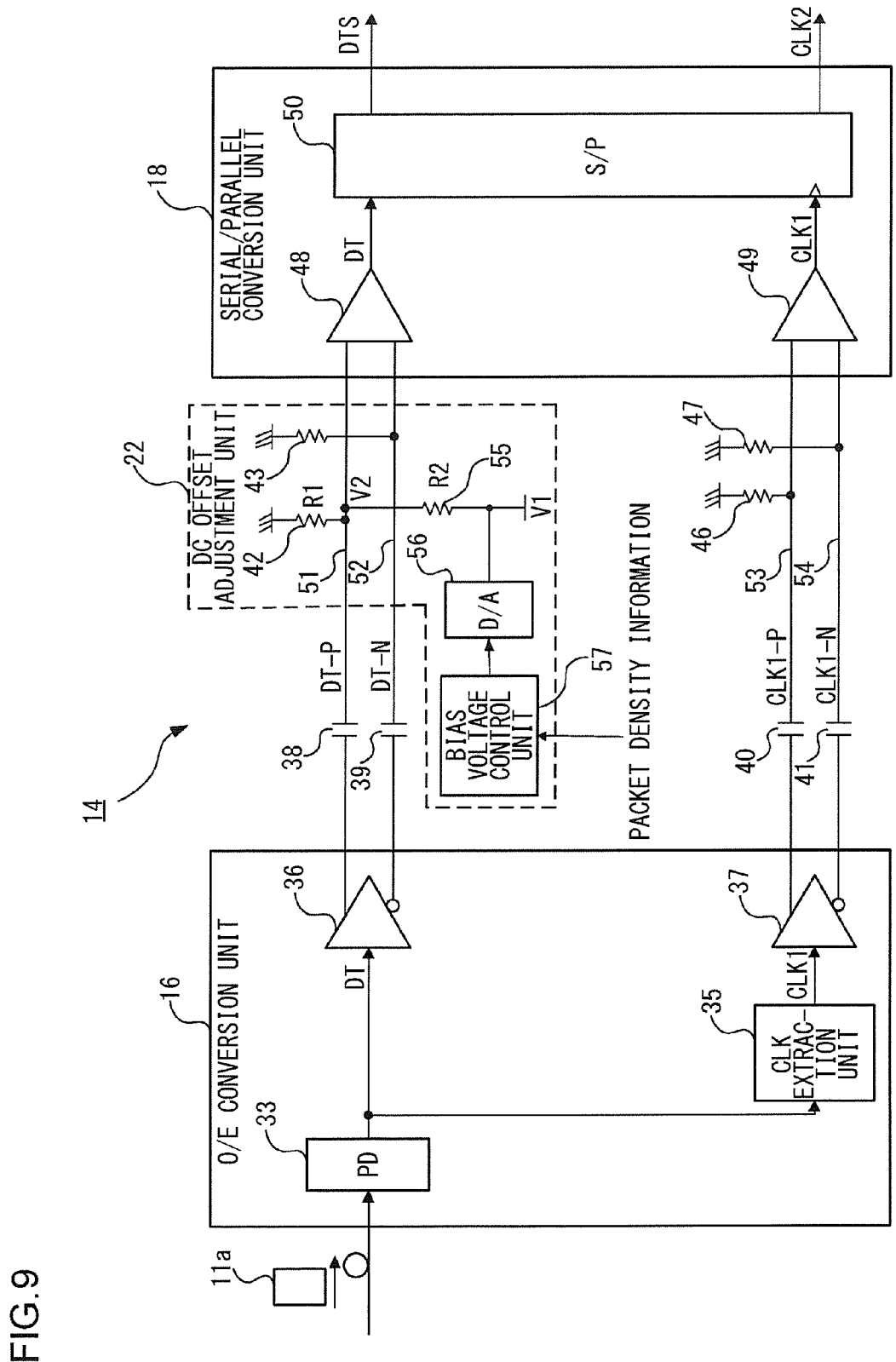
FIG. 9 is a diagram for explaining another embodiment of a DC offset adjustment unit.

FIG. 9 is a diagram for explaining another embodiment of the DC offset adjustment unit. Components of the DC offset adjustment unit 22 shown in FIG. 9, which are identical to or correspond to those of the DC offset adjustment unit 22 shown in FIG. 7, are given the same reference numerals herein and the repeated description thereof are omitted as appropriate.

In the DC offset adjustment unit 22 according to the present embodiment, a resistor 55 whose resistance value is fixed is provided in the place of the variable resistor 45. Also, in the place of the variable resistance control unit 44, a bias voltage control unit 57 and a D/A converter 56 are provided in this DC offset adjustment unit 22.

In the present embodiment, the bias voltage control unit 57 varies a bias voltage V1 via the D/A converter 56 according to the density information supplied from the packet density detector 23. As evident from Equation (2), the DC offset voltage V2 can be adjusted by varying the bias voltage V1.

Figure 10:
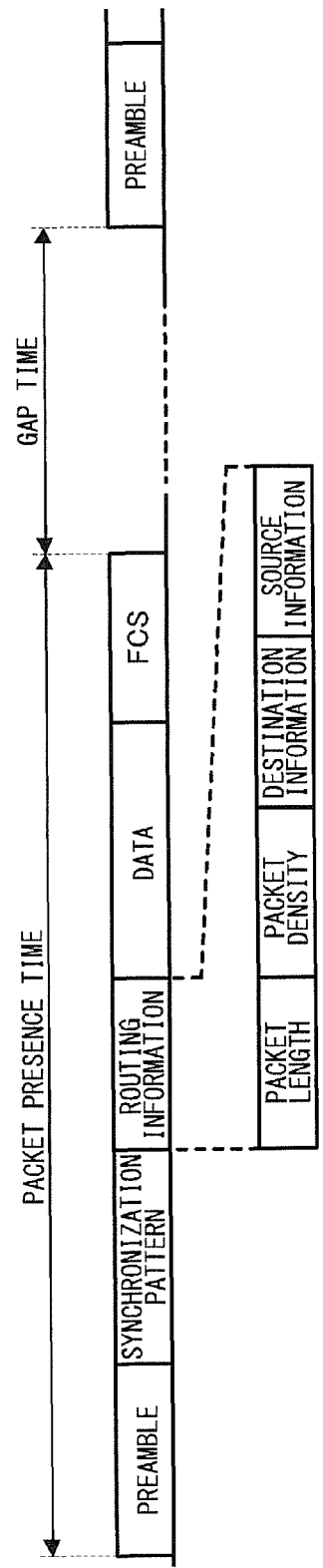
FIG. 10 shows another construction of an optical packet signal.

FIG. 10 shows another construction of an optical packet signal. In the above-described first embodiment, the packet density detector 23 itself calculates the packet density. As shown in FIG. 10, however, if the packet density information is stored in the received optical packet signal, this packet density information may be extracted and then sent to the DC offset adjustment unit 22. In this modification, the structure at a transmitter side (source) of the optical signal needs to be modified but this modification is advantageous in that the calculation of the packet density is no longer required in the optical packet switching apparatus 10.

Second Embodiment

Figure 11:
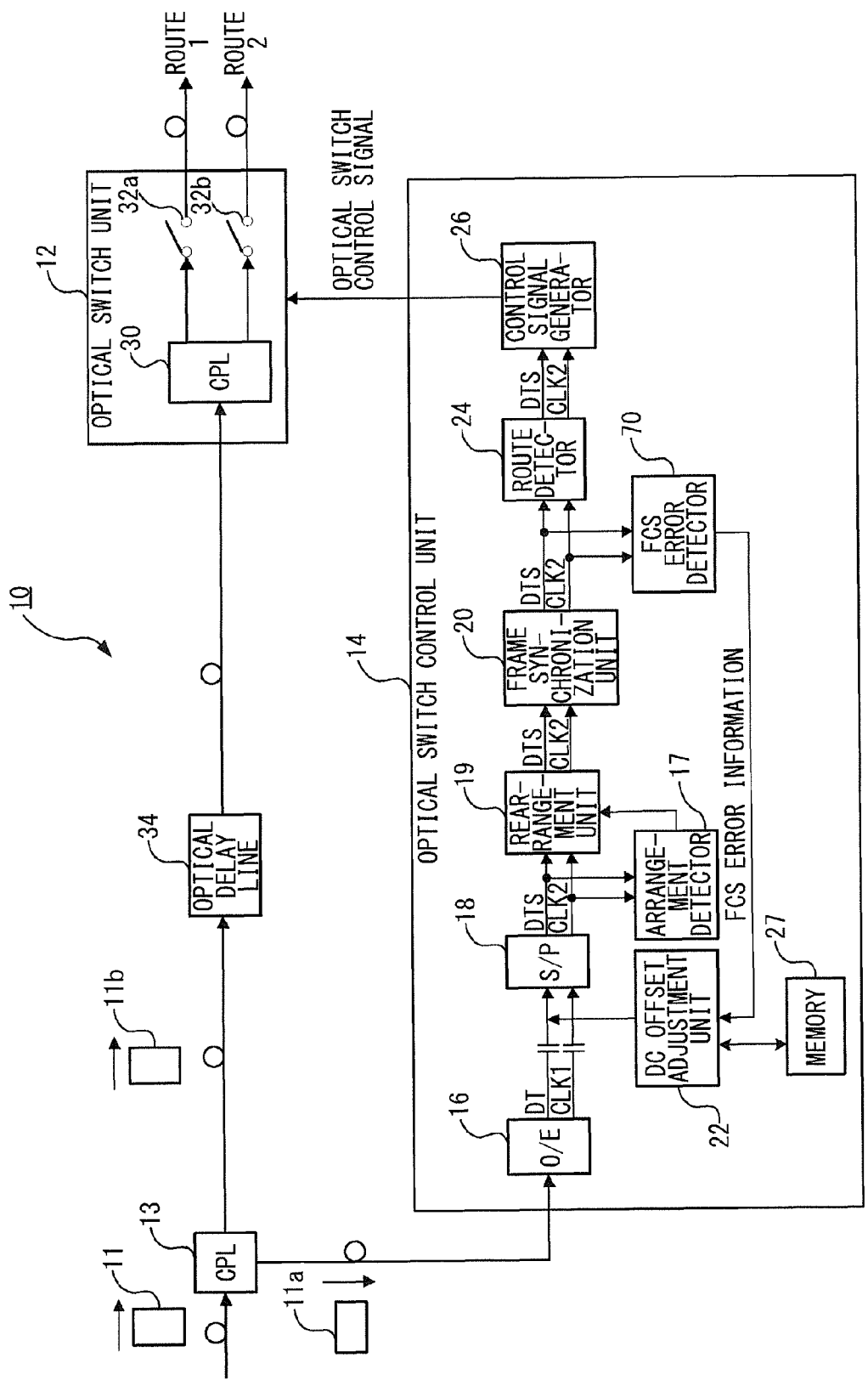
FIG. 11 is a diagram for explaining a structure of an optical packet switching apparatus according to a second embodiment of the present invention.

FIG. 11 is a diagram for explaining a structure of an optical packet switching apparatus according to a second embodiment of the present invention. Components of an optical packet switching apparatus 10 shown in FIG. 10, which are identical to or correspond to those of the optical packet switching apparatus shown in FIG. 5, are given the same reference numerals herein and the repeated description thereof are omitted as appropriate.

The optical packet switching apparatus 10 shown in FIG. 11 differs from the optical packet switching apparatus shown in FIG. 5 in that an FCS (frame check sequence) error detector 70 is provided in substitution for the packet density detector 23.

The parallel packet signals DTS and the frequency-divided clock signal CLK2 are inputted to the FCS error detector 70 from the frame synchronization unit 20. The FCS error detector 70 extracts FCS information contained in the parallel packet signals DTS. The FCS information is information calculated at the transmitter (source) of the optical signal. Also, the FCS error detector 70 calculates the FCS of the received parallel packet signals DTS. An FCS error is detected by comparing the calculated FCS against the FCS information. The FCS error information is sent to the DC offset adjustment unit 22.

The DC offset adjustment unit 22 adjusts the offset voltage of the packet signal DT inputted to the serial/parallel conversion unit 18, according to the FCS error information. More to the point, the FCS error detector 70 detects the FCS error by gradually varying the offset voltage in a predetermined voltage range. The measured FCS error information is stored in the memory 27. After the detection of FCS error in the predetermined voltage range has been completed, the DC offset adjustment unit 22 references the memory 27 and selects a DC offset voltage whose FCS error is minimum. The DC offset adjustment unit 22 may adjust the DC offset voltage of the packet signal DT by controlling the resistance value of the variable resistor 45, as shown in FIG. 7, or may adjust the DC offset voltage of the packet signal DT by controlling the bias voltage, as shown in FIG. 9.

By employing the optical packet switching apparatus 10 as described above, the DC offset voltage of the packet signal DT is adjusted according to the FCS error information. Hence, the quality of the differential packet signal inputted to the serial/parallel conversion unit 18 can be maintained even if the packet density varies. As a result, the routing information can be reliably extracted from the packet signals and therefore the optical packet signal can be suitably switched.

Similar to the first embodiment, the memory 27 may store the DC offset voltage which has been adjusted by the DC offset adjustment unit 22. In this case, the DC offset adjustment unit 22 adjusts the DC offset voltage of the packet signal DT, based on the voltage values stored in the memory 27, when the optical packet switching apparatus 10 is restarted. Thereby, the packet signal can be received with a DC offset voltage set before the restart.

The present invention has been described based upon illustrative embodiments. The above-described embodiments are intended to be illustrative only and it will be obvious to those skilled in the art that various modifications to the combination of constituting elements and processes could be further developed and that such modifications are also within the scope of the present invention.

In the above-described embodiments, for example, the DC offset voltage of the packet signal DT inputted to the serial/parallel conversion unit 18 is adjusted when the optical-to-electrical conversion unit 16 and the serial/parallel conversion unit 18 are capacitively coupled to each other. However, the adjustment point of the DC offset voltage is not limited to a point between the optical-to-electrical conversion unit 16 and the serial/parallel conversion unit 18. If, for example, the rearrangement unit 19 and the frame synchronization unit 20 are capacitively coupled to each other, the DC offset voltage of the packet signal inputted to the frame synchronization unit 20 may be adjusted.

In the above-described embodiments, a description has been given of a structure in which the DC offset voltage of the differential packet signal is adjusted. However, this should not be considered as limiting and, for example, the structure may be such that the DC offset voltage of single-end signal may be adjusted.

In the above-described embodiments, a description has been given of a structure in which the DC offset voltage is adjusted according to the FCS error. However, a method for detecting the error is not limited to the method using the FCS, and any other error detection method may be employed.

What is claimed is:

1. An optical packet switching apparatus comprising:
 a branching unit configured to branch off a received optical packet signal;
 an optical switch unit configured to switch a route of one of the branched-off optical packet signals so as to be outputted;
 an optical switch control unit configured to convert the other of the branched-off optical packet signals into an electrical packet signal, configured to then extract routing information from the packet signal, and configured to control the optical switch unit according to the routing information extracted,
 the optical switch control unit including:
  a first electrical circuit configured to perform a predetermined processing on the packet signal; and
  a second electrical circuit, provided at a stage subsequent to the first electrical circuit, configured to perform a predetermined processing on the packet signal, the second electrical circuit being capacitively coupled to the first electrical circuit;
 a packet density detector configured to detect a packet density of the received optical packet signal; and
 a DC offset adjustment unit configured to adjust a DC offset voltage of the packet signal, inputted to the second electrical circuit, according to information on the packet density detected by the packet density detector.

2. The optical packet switching apparatus according to claim 1, wherein the packet signal is a differential signal in between the first electrical circuit and the second electrical circuit, and
 wherein the DC offset adjustment unit adjusts the DC offset voltage of at least one of a positive signal and a negative signal of the differential signal.

3. The optical packet switching apparatus according to claim 1, wherein the DC offset adjustment unit adjusts the DC offset voltage by referencing a table that describes a relation between the packet density and the DC offset voltage.

4. The optical packet switching apparatus according to claim 1, the packet density detector including:
 a counter configured to count the number of packets received in a preset time duration;
 a packet length detector configured to detect the packet length of each packet signal; and
 a calculating unit configured to calculate the packet density based on information on the number of received packets counted by the counter and information on the packet length detected by the packet length detector.

5. The optical packet switching apparatus according to claim 1, wherein the branching unit receives an optical packet signal in which the information on the packet density is stored, and
 wherein the packet density detector extracts the information on the packet density stored in the optical packet signal.

6. An optical packet switching apparatus comprising:
 a branching unit configured to branch off a received optical packet signal;
 an optical switch unit configured to switch a route of one of the branched-off optical packet signals so as to be outputted;
 an optical switch control unit configured to convert the other of the branched-off optical packet signals into an electrical packet signal, configured to then extract routing information from the packet signal, and configured to control the optical switch unit according to the routing information extracted,
 the optical switch control unit including:
  a first electrical circuit configured to perform a predetermined processing on the packet signal; and
  a second electrical circuit, provided at a stage subsequent to the first electrical circuit, configured to perform a predetermined processing on the packet signal, the second electrical circuit being capacitively coupled to the first electrical circuit;
 an error detector configured to detect error in the received optical packet signal; and
 a DC offset adjustment unit configured to adjust a DC offset voltage of the packet signal, inputted to the second electrical circuit, according to information on the error detected by the error detector.

7. The optical packet switching apparatus according to claim 6, wherein the packet signal is a differential signal in between the first electrical circuit and the second electrical circuit, and wherein the DC offset adjustment unit adjusts the DC offset voltage of at least one of a positive signal and a negative signal of the differential signal.

8. The optical packet switching apparatus according to claim 6, wherein the DC offset adjustment unit adjusts the DC offset voltage in a manner such that the error detected by the error detector is minimum.

9. The optical packet switching apparatus according to claim 6, wherein the error detector is configured in such a manner as to detect the error using a frame check sequence (FCS).

10. The optical packet switching apparatus according to claim 1, further comprising a memory configured to store the DC offset voltage adjusted by the DC offset adjustment unit, wherein, when the optical packet switching apparatus is restarted, the DC offset adjustment unit adjusts the DC offset voltage, based on voltage values stored in the memory.

11. The optical packet switching apparatus according to claim 1, wherein the DC offset adjustment unit is configured such that the DC offset voltage is adjusted by varying a resistance value of a variable resistor.

12. The optical packet switching apparatus according to claim 1, wherein the DC offset adjustment unit is configured such that the DC offset voltage is adjusted by varying a bias voltage.

\* \* \* \* \*